US012562448B2

(12) United States Patent
Takahashi

(10) Patent No.: US 12,562,448 B2
(45) Date of Patent: Feb. 24, 2026

(54) HIGH FREQUENCY POWER DIVIDER

(71) Applicant: KABUSHIKI KAISHA TOSHIBA, Tokyo (JP)

(72) Inventor: Koji Takahashi, Kawasaki Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 208 days.

(21) Appl. No.: 18/253,911

(22) PCT Filed: Nov. 19, 2021

(86) PCT No.: PCT/JP2021/042614
§ 371 (c)(1),
(2) Date: May 22, 2023

(87) PCT Pub. No.: WO2022/113903
PCT Pub. Date: Jun. 2, 2022

(65) Prior Publication Data

US 2023/0411819 A1 Dec. 21, 2023

(30) Foreign Application Priority Data

Nov. 24, 2020 (JP) ................................ 2020-194256

(51) Int. Cl.
*H01P 5/19* (2006.01)

(52) U.S. Cl.
CPC .................................... *H01P 5/19* (2013.01)

(58) Field of Classification Search
CPC ........................................................ H01P 5/12
See application file for complete search history.

(56) References Cited

U.S. PATENT DOCUMENTS 4,367,445 A * 1/1983 Dydyk ...................... H01P 5/16
333/127
4,450,418 A 5/1984 Yum et al.
(Continued)

FOREIGN PATENT DOCUMENTS

CN 106340705 A * 1/2017 ................ H01P 5/20
EP 1 017 124 A 7/2000
(Continued)

OTHER PUBLICATIONS

European Patent Office, Extended European Search Report in EP App. No. 21897877.3, 9 pages (Aug. 30, 2024).
(Continued)

*Primary Examiner* — Andrea Lindgren Baltzell
*Assistant Examiner* — Kimberly E Glenn
(74) *Attorney, Agent, or Firm* — Finnegan, Henderson, Farabow, Garrett & Dunner, LLP

(57) ABSTRACT

A high-frequency power divider includes an insulative substrate and a circuit on the substrate. The circuit includes an input end, first and second output ends, and a resistance element, First and second microstrip lines are between the input and first output ends. Other first and second microstrip lines are between the input and second output ends. The first microstrip lines are connected to the second microstrip lines, which are connected to the first or second output end. A third microstrip line is between one end of the resistance element and a connection point between the first and second microstrip lines. Another third microstrip line is between another end of the resistance element and a connection point between the other first and second microstrip lines. The high-frequency signal phase shift is 90 degrees for each of the first and second microstrip lines and 180 degrees for the third microstrip line.

3 Claims, 4 Drawing Sheets

(56) References Cited

U.S. PATENT DOCUMENTS

| | | | | |
|---|---|---|---|---|
| 4,875,024 | A | 10/1989 | Roberts et al. | |
| 5,630,226 | A | 5/1997 | Kanda et al. | |
| 6,005,442 | A | 12/1999 | Maeda et al. | |
| 2012/0190317 | A1 * | 7/2012 | Martineau ................ | H01P 5/12 455/103 |

FOREIGN PATENT DOCUMENTS

| | | | |
|---|---|---|---|
| JP | S58-115901 | A | 7/1983 |
| JP | H1-241202 | A | 9/1989 |
| JP | H2-81503 | A | 3/1990 |
| JP | H5-22007 | A | 1/1993 |
| JP | H8-32376 | A | 2/1996 |
| JP | H9-321509 | A | 12/1997 |
| JP | 2000-278011 | A | 10/2000 |
| JP | 2009-171420 | A | 7/2009 |

OTHER PUBLICATIONS

Int'l Bureau of WIPO, English trans. of Int'l Preliminary Report on Patentability in PCT/JP2021/042614, 6 pages (Jun. 8, 2023).

* cited by examiner

HIGH FREQUENCY POWER DIVIDER

TECHNICAL FIELD

Embodiments relate to a high-frequency power divider.

BACKGROUND ART

For example, Wilkinson power dividers are used for power distribution in high-frequency bands such as microwaves. When, however, a Wilkinson power divider is multistaged to increase the bandwidth, the power loss is increased, and the circuit scale becomes large.

PRIOR ART DOCUMENTS

Patent Literature

Patent Literature 1

JP-A H09-321509 (Kokai)

SUMMARY OF INVENTION

Technical Problem

Embodiments provide a high-frequency power divider in which a wider bandwidth is possible.

Solution to Problem

A high-frequency power divider according to an embodiment includes an insulative substrate and a circuit located on the substrate. The circuit includes an input end, a first output end, a second output end, multiple first microstrip lines, multiple second microstrip lines, multiple third microstrip lines, and a resistance element. One first microstrip line among the multiple first microstrip lines and one second microstrip line among the multiple second microstrip lines are located between the input end and the first output end. Another first microstrip line among the multiple first microstrip lines and another second microstrip line among the multiple second microstrip lines are located between the input end and the second output end. The input end is connected to a first end of the one first microstrip line and a first end of the other first microstrip line. A second end of the one first microstrip line is connected to a first end of the one second microstrip line; and a second end of the one second microstrip line is connected to the first output end. A second end of the other first microstrip line is connected to a first end of the other second microstrip line; and a second end of the other second microstrip line is connected to the second output end. A first end of one third microstrip line among the multiple third microstrip lines is connected to the second end of the one first microstrip line and the first end of the one second microstrip line. A second end of the one third microstrip line is connected to one end of the resistance element. A first end of another third microstrip line among the multiple third microstrip lines is connected to the second end of the other first microstrip line and the first end of the other second microstrip line. A second end of the other third microstrip line is connected to another end of the resistance element. A phase shift of a high-frequency signal between the first end and the second end of each of the multiple first microstrip lines is 90 degrees; and a phase shift of a high-frequency signal between the first end and the second end of each of the multiple second microstrip lines is 90 degrees. A phase shift of a high-frequency signal between the first end and the second end of each of the multiple third microstrip lines is 180 degrees.

DESCRIPTION OF EMBODIMENTS

Figure 1:
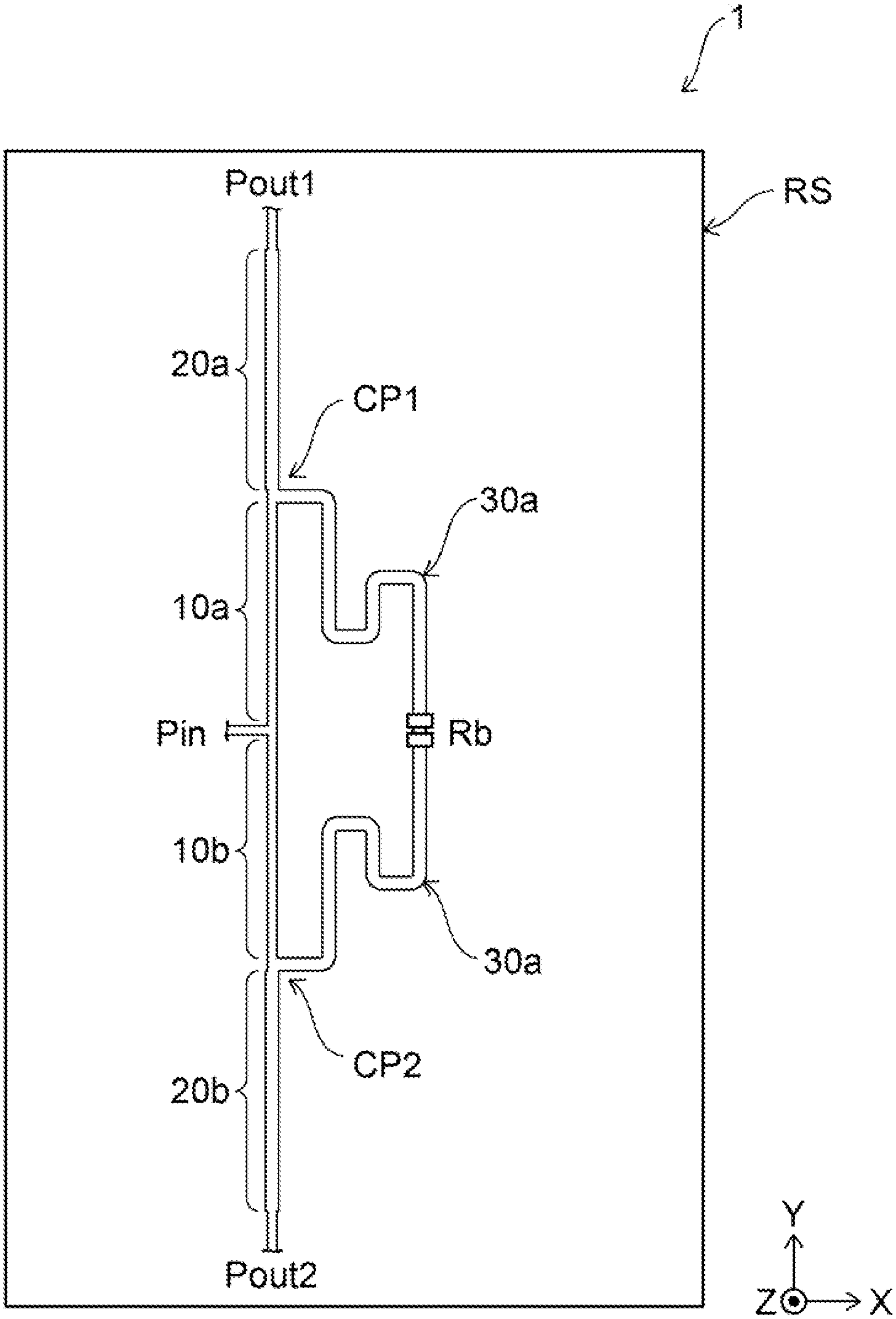
FIG. 1 is a schematic plan view illustrating a high-frequency power divider according to an embodiment.

Embodiments will now be described with reference to the drawings. The same portions in the drawings are marked with the same numerals; a detailed description is omitted as appropriate; and different portions are described. The drawings are schematic or conceptual; and the relationships between the thickness and width of portions, the proportions of sizes among portions, etc., are not necessarily the same as the actual values. Also, the dimensions and proportions may be illustrated differently among drawings, even when the same portion is illustrated.

Furthermore, the arrangements and configurations of the portions are described using an X-axis, a Y-axis, and a Z-axis shown in the drawings. The X-axis, the Y-axis, and the Z-axis are orthogonal to each other and respectively represent an X-direction, a Y-direction, and a Z-direction. Also, there are cases where the Z-direction is described as up, and the opposite direction is described as down.

FIG. 1 is a schematic plan view illustrating a high-frequency power divider 1 according to an embodiment. The high-frequency power divider 1 includes, for example, multiple microstrip lines and a resistance element Rb located on a surface of an insulating substrate RS. The insulating substrate RS includes, for example, a resin or a ceramic, and includes a not-illustrated metal layer on the back side. The multiple microstrip lines include, for example, copper (Cu) or gold (Au).

As shown in FIG. 1, the high-frequency power divider 1 includes an input end Pin, a first output end Pout1, a second output end Pout2, multiple first microstrip lines 10*a* and 10*b*, multiple second microstrip lines 20*a* and 20*b*, multiple third microstrip lines 30*a* and 30*b*, and the resistance element Rb.

For example, the input end Pin, the first output end Pout1, and the second output end Pout2 are arranged along the surface of the insulating substrate RS in a first direction, e.g., the Y-direction. The input end Pin is located between the first output end Pout1 and the second output end Pout2. Also, for example, the input end Pin and the resistance element Rb are arranged along the surface of the insulating substrate in a second direction, e.g., the X-direction, which crosses the first direction.

The first microstrip line 10*a* and the second microstrip line are located between the input end Pin and the first output end Pout1. Also, the first microstrip line 10*b* and the second microstrip line 20*b* are located between the input end Pin and the second output end Pout2.

The first microstrip lines 10$a$ and 10$b$ and the second microstrip lines 20$a$ and 20$b$ each extend in the Y-direction. Each of the first microstrip lines 10$a$ and 10$b$ and the second microstrip lines 20$a$ and 20$b$ includes one end (hereinbelow, a first end) and another end (hereinbelow, a second end) without branching.

The input end Pin is connected to the first end of the first microstrip line 10$a$ and the first end of the first microstrip line 10$b$.

The second end of the first microstrip line 10$a$ is connected to the first end of the second microstrip line 20$a$. The second end of the second microstrip line 20$a$ is connected to the first output end Pout1.

The second end of the first microstrip line 10$b$ is connected to the first end of the second microstrip line 20$b$. The second end of the second microstrip line 20$b$ is connected to the second output end Pout2.

The third microstrip line 30$a$ is located between the resistance element Rb and a connection point CP1 between the first microstrip line 10$a$ and the second microstrip line 20$a$. A first end of the third microstrip line 30$a$ is connected to the second end of the first microstrip line 10$a$ and the first end of the second microstrip line 20$a$ at the connection point CP1. Also, a second end of the third microstrip line 30$a$ is connected to one end of the resistance element Rb.

The third microstrip line 30$b$ is located between the resistance element Rb and a connection point CP2 between the first microstrip line 10$b$ and the second microstrip line 20$b$. A first end of the third microstrip line 30$b$ is connected to the second end of the first microstrip line 10$b$ and the first end of the second microstrip line 20$b$ at the connection point CP2. Also, a second end of the third microstrip line 30$b$ is connected to another end of the resistance element Rb.

Figure 2:
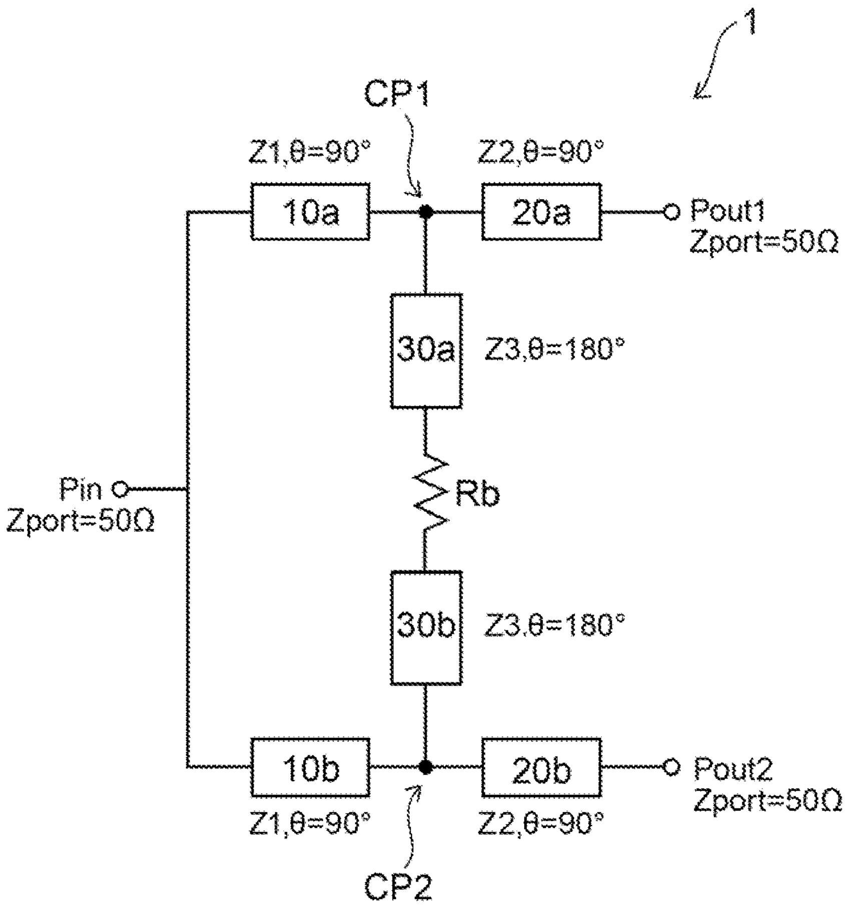
FIG. 2 is a circuit diagram illustrating the high-frequency power divider according to the embodiment.

FIG. 2 is a circuit diagram illustrating the high-frequency power divider 1 according to the embodiment. As shown in FIG. 2, the input end Pin, the first output end Pout1, and the second output end Pout2 are provided so that each has a characteristic impedance Zport of 50Ω.

The first microstrip lines 10$a$ and 10$b$ are provided so that each has a characteristic impedance Z1 and a phase shift of 90 degrees for the high-frequency signal between the first end and the second end.

The second microstrip lines 20$a$ and 20$b$ are provided so that each has a characteristic impedance Z2 and a phase shift of degrees for the high-frequency signal between the first end and the second end.

The third microstrip lines 30$a$ and 30$b$ are provided so that each has a characteristic impedance Z3 and a phase shift of 180 degrees for the high-frequency signal between the first end and the second end.

Figure 3:
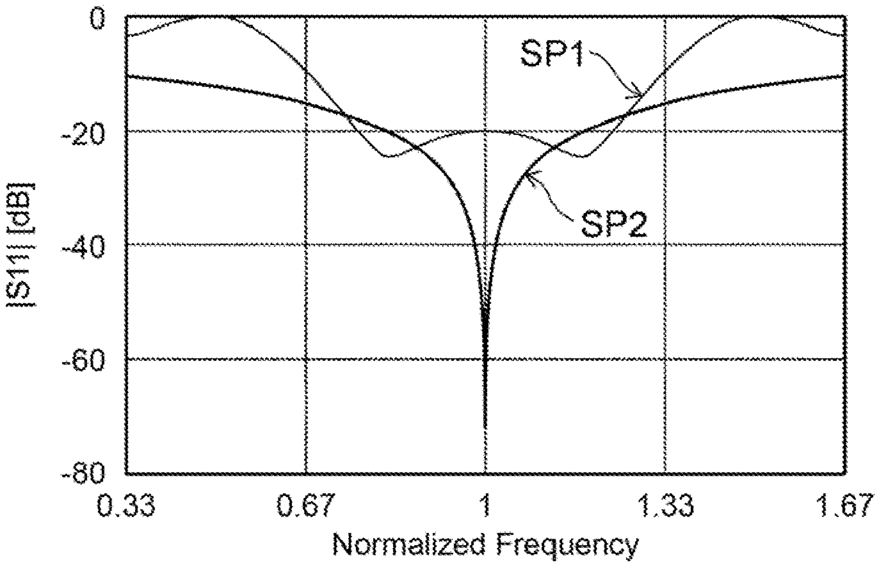
FIG. 3 is a graph illustrating a characteristic of the high-frequency power divider according to the embodiment.

FIG. 3 is a graph illustrating a characteristic of the high-frequency power divider 1 according to the embodiment. The horizontal axis is the value of the signal frequency normalized by the center frequency. The vertical axis is the absolute value of S11 (dB). FIG. 3 shows a characteristic SP1 of the high-frequency power divider 1 according to the embodiment and a characteristic SP2 of a high-frequency power divider 2 according to a comparative example (see FIG. 5).

Figure 5A:
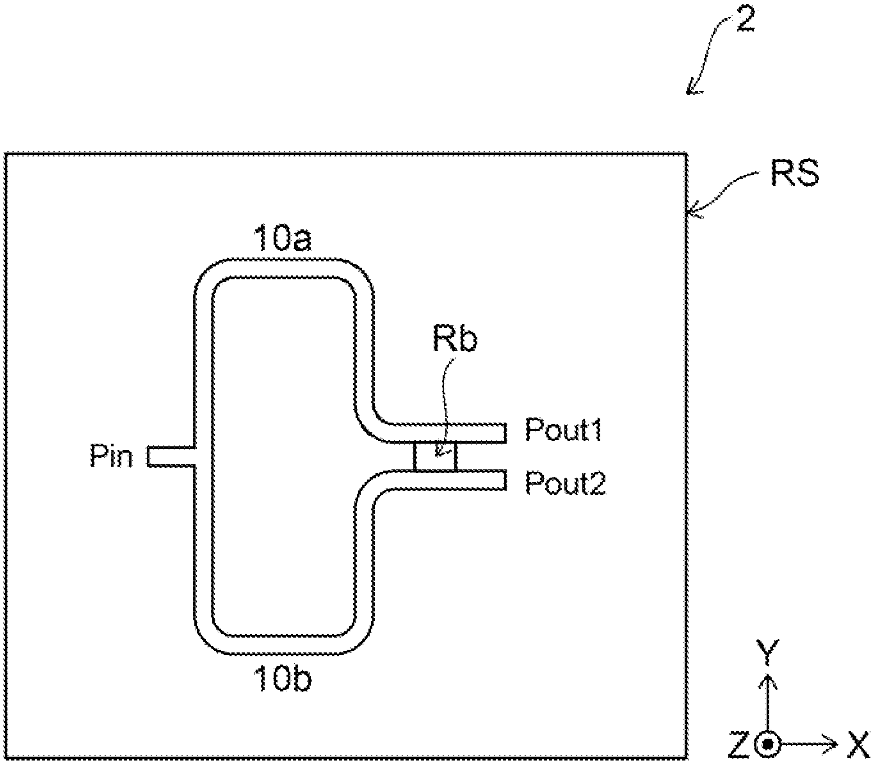
FIG. 5 is a circuit diagram and a schematic plan view illustrating a high-frequency power divider according to a comparative example.
Figure 5B:
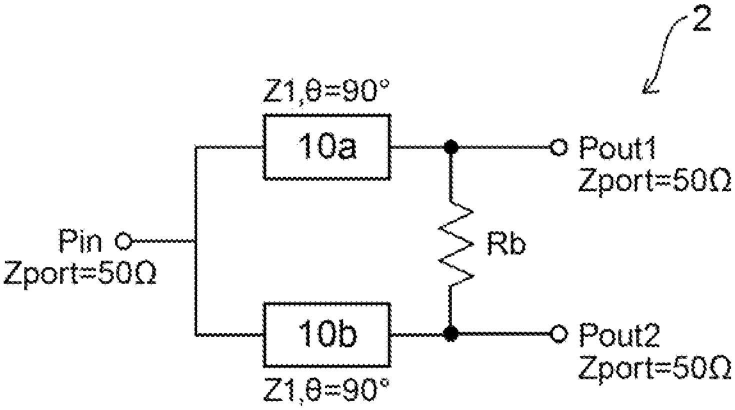

FIG. 5A is a schematic plan view showing the high-frequency power divider 2; and FIG. 5B is a circuit diagram showing the high-frequency power divider 2. As shown in FIG. the high-frequency power divider 2 is located on a surface of the insulating substrate RS. The high-frequency power divider 2 is a Wilkinson power divider.

The high-frequency power divider 2 includes the input end Pin, the first output end Pout1, the second output end Pout2, the first microstrip line 10$a$, the first microstrip line 10$b$, and the resistance element Rb. For example, the input end Pin, the first output end Pout1, and the second output end Pout2 are arranged in the X-direction; and the input end Pin and the resistance element Rb also are arranged in the X-direction.

The first microstrip line 10$a$ is located between the input end Pin and the first output end Pout1. The first end of the first microstrip line 10$a$ is connected to the input end Pin; and the second end of the first microstrip line 10$a$ is connected to the one end of the resistance element Rb.

The first microstrip line 10$b$ is located between the input end Pin and the second output end Pout2. The first end of the first microstrip line 10$b$ is connected to the input end Pin; and the second end of the first microstrip line 10$b$ is connected to the other end of the resistance element Rb.

The first output end Pout1 and the second output end Pout2 are connected respectively to the one end and the other end of the resistance element Rb.

As shown in FIG. 5B, the input end Pin, the first output end Pout1, and the second output end Pout2 are provided so that each has the characteristic impedance Zport of 50Ω. The first microstrip lines 10$a$ and 10$b$ are provided so that each has the characteristic impedance Z1 and a phase shift of 90 degrees for the high-frequency signal between the first end and the second end.

As shown in FIG. 3, the characteristic SP2 of the high-frequency power divider 2 has a minimum value at the center frequency. The center frequency is, for example, 3 GHz. On the other hand, for example, for the characteristic SP1 of the high-frequency power divider 1, |S11| becomes small in the fractional bandwidth range of 0.67 to 1.33 corresponding to the bandwidth of 2 to 4 GHz. For example, looking at the bandwidth where |S11| is not more than −20 dB, the high-frequency power divider 1 has a wider fractional bandwidth than the high-frequency power divider 2.

Also, as shown in FIG. 1, the first and second output ends Pout1 and Pout2 of the high-frequency power divider 1 are arranged to be separated from each other in the Y-direction. It is therefore easier to connect to next-stage circuits compared to the high-frequency power divider 2 in which the first output end Pout1 and the second output end Pout2 are located at the two ends of the resistance element Rb.

Figure 4:
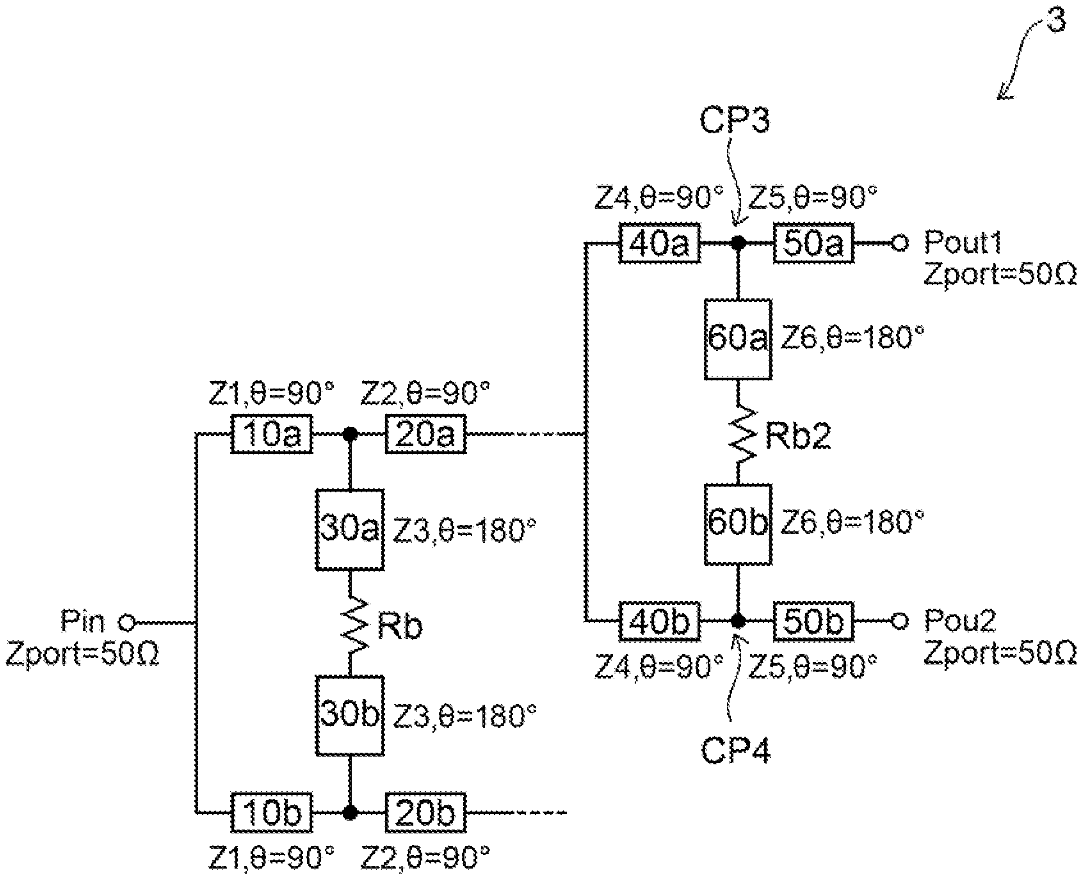
FIG. 4 is a circuit diagram illustrating a high-frequency power divider according to a modification of the embodiment.

FIG. 4 is a circuit diagram illustrating a high-frequency power divider 3 according to a modification of the embodiment. The high-frequency power divider 3 has a circuit configuration in which a power divider circuit having the same structure is connected in series to the first output end Pout1 of the power distribution circuit shown in FIG. 2.

As shown in FIG. 4, the high-frequency power divider 3 further includes fourth microstrip lines 40$a$ and 40$b$, fifth microstrip lines 50$a$ and 50$b$, sixth microstrip lines 60$a$ and 60$b$, and a resistance element Rb2.

The fourth microstrip line 40$a$ and the fifth microstrip line 50$a$ are located between the second microstrip line 20$a$ and the first output end Pout1. A first end of the fourth microstrip line 40$a$ is connected to the second end of the second microstrip line and a second end of the fourth microstrip line 40$a$ is connected to a first end of the fifth microstrip line 50$a$. A second end of the fifth microstrip line 50$a$ is connected to the first output end Pout1.

The fourth microstrip line 40$b$ and the fifth microstrip line are located between the second microstrip line 20$a$ and the second output end Pout2. A first end of the fourth microstrip line 40$b$ is connected to the second end of the second microstrip line 20$a$; and a second end of the fourth microstrip line 40$b$ is connected to a first end of the fifth microstrip line 50*b*. A second end of the fifth microstrip line 50*b* is connected to the second output end Pout2.

The sixth microstrip line 60*a* is located between the resistance element Rb2 and a connection point CP3 between the fourth microstrip line 40*a* and the fifth microstrip line 50*a*. A first end of the sixth microstrip line 60*a* is connected to the second end of the fourth microstrip line 40*a* and the first end of the fifth microstrip line 50*a* at the connection point CP3. Also, a second end of the third microstrip line 60*a* is connected to one end of the resistance element Rb2.

The sixth microstrip line 60*b* is located between the resistance element Rb2 and a connection point CP4 between the fourth microstrip line 10*b* and the fifth microstrip line 50*b*. A first end of the sixth microstrip line 60*b* is connected to the second end of the fourth microstrip line 40*b* and the first end of the fifth microstrip line 50*b* at the connection point CP4. Also, a second end of the sixth microstrip line 60*b* is connected to another end of the resistance element Rb2.

The fourth microstrip lines 40*a* and 40*b* are provided so that each has a characteristic impedance Z4 and a phase shift of degrees for the high-frequency signal between the first end and the second end.

The fifth microstrip lines 50*a* and 50*b* are provided so that each has a characteristic impedance Z5 and a phase shift of 90 degrees for the high-frequency signal between the first end and the second end.

The sixth microstrip lines 60*a* and 60*b* are provided so that each has a characteristic impedance Z6 and a phase shift of 180 degrees for the high-frequency signal between the first end and the second end.

The high-frequency power divider 3 further includes a circuit (not illustrated) similar to FIG. 2 connected to the second microstrip line 20*b*. The high-frequency power divider 3 further includes a third output end Pout3 and a fourth output end Pout4 (not illustrated).

Although a configuration in which two stages of the circuit shown in FIG. 2 are connected is shown in the example, the embodiments are not limited thereto. For example, when N stages of the circuit shown in FIG. 2 are included, the number of output ends is 2N. In other words, a high-frequency power divider that has 2N output ends can be configured.

While certain embodiments of the inventions have been described, these embodiments have been presented by way of example only, and are not intended to limit the scope of the inventions. These novel embodiments may be embodied in a variety of other forms; and various omissions, substitutions, and changes may be made without departing from the spirit of the inventions. Such embodiments and their modifications are within the scope and spirit of the inventions, and are within the scope of the inventions described in the claims and their equivalents.

REFERENCE NUMERAL LIST

1, 2, 3 high-frequency power divider
10*a*, 10*b* first microstrip line
20*a*, 20*b* second microstrip line
30*a*, 30*b* third microstrip line
40*a*, 40*b* fourth microstrip line
50*a*, 50*b* fifth microstrip line
60*a*, 60*b* sixth microstrip line
CP1, CP2, CP3, CP4 connection point
Pin input end
Pout1 first output end
Pout2 second output end
RS insulating substrate
Rb, Rb2 resistance element

The invention claimed is:

1. A high-frequency power divider, comprising:

a substrate, the substrate being insulative; and a circuit located on the substrate, the circuit including an input end, a first output end, a second output end, a plurality of first microstrip lines, a plurality of second microstrip lines, a plurality of third microstrip lines, and a resistance element, one first microstrip line among the plurality of first microstrip lines and one second microstrip line among the plurality of second microstrip lines being located between the input end and the first output end, an other first microstrip line among the plurality of first microstrip lines and another second microstrip line among the plurality of second microstrip lines being located between the input end and the second output end, the input end being connected to a first end of the one first microstrip line and a first end of the other first microstrip line, a second end of the one first microstrip line being connected to a first end of the one second microstrip line, a second end of the one second microstrip line being connected to the first output end, a second end of the other first microstrip line being connected to a first end of the other second microstrip line, a second end of the other second microstrip line being connected to the second output end, a first end of one third microstrip line among the plurality of third microstrip lines being connected to the second end of the one first microstrip line and the first end of the one second microstrip line, a second end of the one third microstrip line being connected to one end of the resistance element, a first end of another third microstrip line among the plurality of third microstrip lines being connected to the second end of the other first microstrip line and the first end of the other second microstrip line, a second end of the other third microstrip line being connected to another end of the resistance element, a phase shift of a high-frequency signal between the first end and the second end of each of the plurality of first microstrip lines being 90 degrees, a phase shift of a high-frequency signal between the first end and the second end of each of the plurality of second microstrip lines being 90 degrees, a phase shift of a high-frequency signal between the first end and the second end of each of the plurality of third microstrip lines being 180 degrees, wherein the input end, the first output end, and the second output end are arranged in a first direction along a surface of the substrate, the input end is located between the first output end and the second output end, and the one first microstrip line, the other first microstrip line, the second microstrip line, and the other second microstrip line each extend in the first direction, the input end and the resistance element are arranged in a second direction along the surface of the substrate, and the second direction crosses the first direction, the one third microstrip line includes:

a first portion extending in the second direction from the first end of the one third microstrip line;

a second portion extending from a tip of the first portion to a side opposite to the first direction;

a third portion extending in the second direction from a tip of the second portion, a fourth portion extending in the first direction from the tip of the third portion;

a fifth portion extending in the second direction from the tip of the fourth portion; and a sixth portion extending from the tip of the fifth portion to the second end of the one first microstrip line, and the other third microstrip line includes:

a first portion extending in the second direction from the first end of the other third microstrip line;

a second portion extending in the first direction from a tip of the first portion;

a third portion extending in the second direction from a tip of the second portion:

a fourth portion extending in a direction opposite to the first direction from the tip of the third portion;

a fifth portion extending in the second direction from the tip of the fourth portion; and a sixth portion extending from the tip of the fifth portion to the second end of the other third microstrip line.

2. The high-frequency power divider according to claim 1, wherein characteristic impedances of the input end, the first output end, and the second output end are 50Ω.

3. A high-frequency power divider, comprising:

a plurality of the circuits according to claim 1, the plurality of circuits including first and second circuits, a first output end of the first circuit being connected to an input end of the second circuit.

* * * * *